United States Patent
Zhang et al.

(10) Patent No.: US 10,514,507 B1
(45) Date of Patent: Dec. 24, 2019

(54) ULTRA-SMALL-PITCH OPTICAL FILTER ASSEMBLY

(71) Applicants: Qingming Zhang, Shenzhen (CN);
Xiaodong Huang, Shenzhen (CN);
Yuan Liu, Shenzhen (CN); Jinghui Li,
Sierra Madre, CA (US)

(72) Inventors: Qingming Zhang, Shenzhen (CN);
Xiaodong Huang, Shenzhen (CN);
Yuan Liu, Shenzhen (CN); Jinghui Li,
Sierra Madre, CA (US)

(73) Assignee: Auxora (Shenzhen) Inc., Shenzhen (CN)

( * ) Notice: Subject to any disclaimer, the term of this patent is extended or adjusted under 35 U.S.C. 154(b) by 0 days.

(21) Appl. No.: 16/431,583

(22) Filed: Jun. 4, 2019

(51) Int. Cl.
| | |
|---|---|
| G02B 6/293 | (2006.01) |
| G02B 5/20 | (2006.01) |
| G02B 27/30 | (2006.01) |
| G02B 27/09 | (2006.01) |
| G02B 27/10 | (2006.01) |
| F21V 8/00 | (2006.01) |

(52) U.S. Cl.
CPC ............. *G02B 6/2938* (2013.01); *G02B 5/20* (2013.01); *G02B 6/2937* (2013.01); *G02B 6/29389* (2013.01); *G02B 27/0955* (2013.01); *G02B 27/1006* (2013.01); *G02B 27/30* (2013.01); *G02B 6/0033* (2013.01)

(58) Field of Classification Search
CPC ............. G02B 6/0033; G02B 6/29358; G02B 6/2937; G02B 6/2938; G02B 6/29389; G02B 6/4204; G02B 6/4212; G02B 5/20; G02B 27/0955; G02B 27/30; G02B 27/1006
USPC .......... 385/24, 27, 31, 33–34, 39, 47, 88–92
See application file for complete search history.

(56) References Cited

U.S. PATENT DOCUMENTS

| 6,201,908 B1 * | 3/2001 | Grann ................ G02B 6/29358 385/24 |
| 2006/0078252 A1 * | 4/2006 | Panotopoulos .... G02B 6/29367 385/24 |

* cited by examiner

*Primary Examiner* — Michael P Mooney

(57) ABSTRACT

Embodiments of present invention provide an ultra-small-pitch optical filter assembly. The assembly includes a fiber collimator being able to receive an optical signal; a WDM filter module being able to de-multiplex the optical signal from the fiber collimator into multiple optical beams; and an optical lens assembly being able to receive the multiple optical beams from the WDM filter module and to reduce a physical spacing among the multiple optical beams from a first pitch D to a second pitch d, wherein D/d A method of fabricating the ultra-small-pitch optical filter assembly is also provided. A method of producing a set of optical beams with ultra-small-pitch of spacing is provided as well.

19 Claims, 5 Drawing Sheets

ULTRA-SMALL-PITCH OPTICAL FILTER ASSEMBLY

CROSS REFERENCE TO RELATED APPLICATION

The present application claims benefit of priority to a Chinese patent application S/N: 201810841008.9, filed Jul. 26, 2018 with the China National Intellectual Property Administration, the content of which is incorporated herein by reference in its entirety.

FIELD OF THE INVENTION

The present application relates generally to optical fiber communication field and more particularly to the structure of an ultra-small-pitch optical filtering device assembly and the manufacturing thereof.

BACKGROUND

Optical transmission assembly may be divided into single-mode optical transmission assembly and multi-mode optical transmission assembly. From an overall product or device standpoint, optical signal transmission assembly may include Optical Subassembly (OSA) and Electrical Subassembly (ESA). Optical subassembly may further be divided into Transmitter Optical Subassembly (TOSA) and Receiver Optical Subassembly (ROSA).

A receiver optical subassembly (ROSA) that uses thin-film filter as key element often includes multiple optical signal channels, such as four (4) channels, with a spacing between the channels being typically around 0.5 mm to 0.75 mm. Due to difficulty and associated loss in making and assembling thin-film filters of smaller than 0.5 mm, by conventional structure and manufacturing approach, it is difficult to make optical filtering device assembly with smaller channel spacing. Optical filtering device assembly with smaller channel spacing may be made using waveguide divider that is based on planar lightwave circuit (PLC). However, planar lightwave circuit or waveguide has relatively low channel isolation and requires complicated manufacturing process. Because of high technical threshold of entry and manufacturing cost, PLC-based devices are generally suitable for dividers or filtering devices of high channel count, but not suitable for those devices of relatively low channel count.

In general, spacing in optical filtering device assembly determines the spacing of photo-diode array in a corresponding electrical subassembly (ESA). Usually, a bigger spacing of photo-diode array is coupled with great manufacturing difficulty, low yield, and high cost. Therefore, there is a need to manufacturing optical filtering device or assembly with smaller spacing to facilitate the use and manufacturing of electrical subassembly with smaller photo-diode array spacing thereby reducing the overall cost of corresponding optical subassembly (OSA).

SUMMARY

Embodiment of present invention provides an optical filter assembly with very small beam spacing, referred herein as ultra-small-pitch (USP) of spacing. The optical filter assembly may include a fiber collimator being able to receive an optical signal; a WDM filter module being able to de-multiplex the optical signal coming from the fiber collimator into a plurality of optical beams based on their wavelength; and an optical lens assembly being able to receive the plurality of optical beams from the WDM filter module and reduce a physical spacing among the plurality of optical beams from a first pitch D of spacing to a second pitch d of spacing, wherein $D/d \geq 2$.

According to one embodiment, the WDM filter module of the USP optical filter assembly may include a glass body, with a front end of the glass body facing the fiber collimator, and a rear end of the glass body facing the optical lens assembly. In one embodiment, a surface of the rear end is mounted with at least four WDM filter elements that correspond, respectively, to at least four of the plurality of optical beams.

According to another embodiment, the optical lens assembly of the USP optical filter assembly may include a contracting lens module being able to reduce the physical spacing among the plurality of optical beams from the first pitch D of spacing to the second pitch d of spacing; and a steering lens module being able to provide focus and steer propagation direction of the plurality of optical beams having the second pitch d of spacing.

In one embodiment, the contracting lens module of the USP optical filter assembly has a front end of convex surface facing the WDM filter module; and a rear end of concave surface facing the steering lens module, a focal point of the convex surface coincides with a focal point of the concave surface; and a focal length F of the convex surface and a focal length f of the concave surface satisfies $F/f \geq 2$ with $D/d = F/f$.

In another embodiment, the steering lens module of the USP optical filter assembly has a micro-lens array mounted at a front end surface thereof, the micro-lens array includes at least four micro-lenses that provide focus of at least four respective optical beams coming from the contracting lens module having the second pitch d of spacing. In a further embodiment, the steering lens module further includes a rear surface that is inclined in an angle to optical beams passing through the micro-lenses, the inclined rear surface steers the optical beams from a first direction towards a second direction that is different from the first direction.

According to yet another embodiment, the fiber collimator, the WDM filter module, the contracting lens module, and the steering lens module of the USP optical filter assembly may be optically aligned in a horizontal direction. For example, the fiber collimator, the WDM filter module, the contracting lens module and the steering lens module of the optical lens assembly are mounted on a common substrate, which has one or more height-adjusting steps that are provided to cause the fiber collimator, the WDM filter module, and the optical lens assembly to be vertically adjusted with respect to a common optical axis.

BRIEF DESCRIPTION OF THE DRAWINGS

The present invention will be understood and appreciated more fully from the following detailed description of embodiments of the invention, taken in conjunction with accompanying drawings of which.

Figure 1:
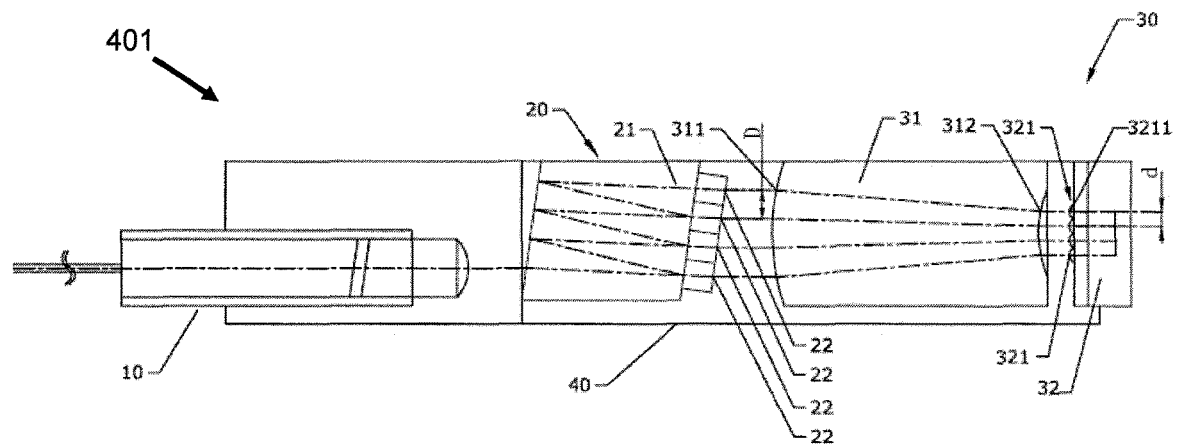
FIG. 1 is a demonstrative illustration of top plan view of an ultra-small-pitch optical filter assembly according to one embodiment of present invention.

It will be appreciated that for simplicity and clarity purpose, elements shown in the drawings have not necessarily been drawn to scale. Further, in various functional block diagrams, two connected devices and/or elements may not necessarily be illustrated as being connected. In some other instances, grouping of certain elements in a functional block diagram may be solely for the purpose of description and may not necessarily imply that they are in a single physical entity or they are embodied in a single physical entity.

DETAILED DESCRIPTION OF PREFERRED EMBODIMENTS

FIG. 1 is a demonstrative illustration of top plan view of an ultra-small-pitch optical filter assembly according to one embodiment of present invention. Ultra-small-pitch (USP) optical filter assembly 401 may include, e.g., a fiber collimator 10 for accepting or receiving a WDM (wavelength-division-multiplexing) optical signal, a WDM filter module or assembly 20, and an optical lens assembly 30, all optically aligned along a common horizontal optical axis. After being launched into optical filter assembly 401, the WDM optical signal received by fiber collimator 10 may be de-multiplexed by WDM filter module 20 into individual signal channels in a form of multiple individual optical beams (of different wavelengths), as being described below in more details. The individual optical beams may subsequently pass through optical lens assembly 30, within which physical spacing among individual optical beams may be reduced, according to one embodiment, resulting in a set of optical beams with an ultra-small-pitch of spacing. Optical lens assembly 30 may also further provide focus and steer propagation direction of the optical beams to in a direction toward, for example, a photodiode array (not shown) for detection and signal processing. By reducing the physical spacing among the multiple optical beams through optical lens assembly 30, thereby producing a set of (de-multiplexed) output optical signals or a plurality of optical beams of ultra-small-pitch of spacing, less space is needed between individual photodiodes in a photodiode array, which advantageously results in lowered manufacturing cost of the photodiode array and a corresponding OSA module.

Figure 2:
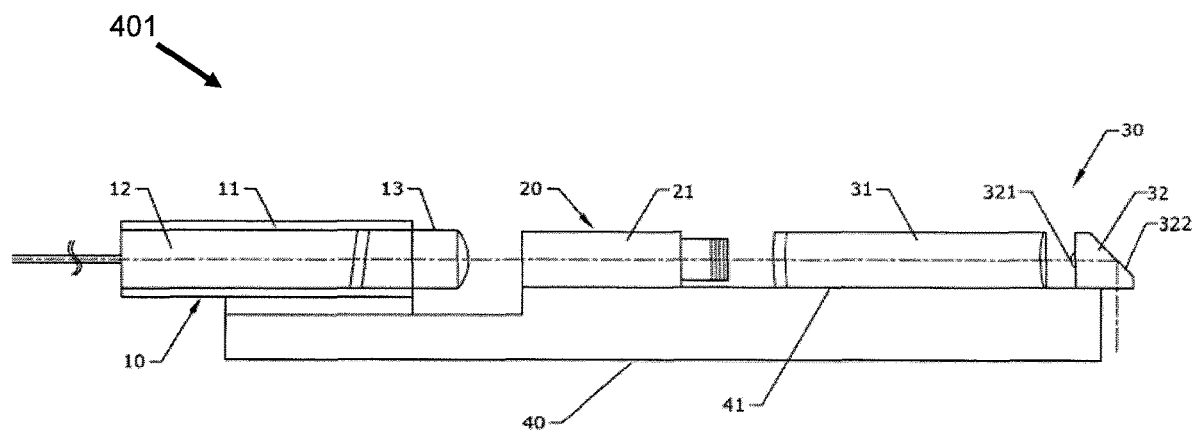
FIG. 2 is a demonstrative illustration of front elevation view of the ultra-small-pitch optical filter assembly as illustrated in FIG. 1.

As is illustrated in FIG. 2, which is a demonstrative illustration of front elevation view of the ultra-small-pitch optical filter assembly as illustrated in FIG. 1, fiber collimator 10 may include a glass tube 11 that hosts an input fiber 12 and an output optical lens 13. Input fiber 12 may be inserted into one end of glass tube 11 and optical lens 13 may be attached to the other end of glass tube 11. Under normal application, a WDM optical signal having multiple different wavelengths such as, for example, four (4) wavelengths which may be used from time to time hereinafter as a non-limiting example, may come through fiber 12, pass through optical lens 13, and be subsequently launched into WDM filter module 20.

WDM filter module 20 may include a glass body 21 that has a front surface and a rear surface. Front surface of glass body 21 may face fiber collimator 10, and rear surface of glass body 21 may have, for example, four (4) WDM filter elements 22 mounted thereupon (see FIG. 1). A WDM optical signal coming from fiber collimator 10 may propagate or pass onto WDM filter module 20, through glass body 21, and be de-multiplexed by WDM filter elements 22 into, for example, four (4) different optical beams based upon their specific wavelengths. The four (4) optical beams may have a first pitch D of physical spacing among themselves, which is generally decided by the size and/or spacing of WDM filter elements 22. Further here, a person skilled in the art will appreciate that WDM filter module 20 may have any number of WDM filter elements 22 such as, for example, eight (8) or twelve (12) WDM filter elements 22, and the number four (4) is used here for the convenience of illustration and description only.

As is demonstratively illustrated in both FIG. 1 and FIG. 2, optical lens assembly 30 may include a first lens assembly 31, referred to hereinafter as a contracting lens module, that may be adapted and/or able to reduce a physical spacing among different optical beams such as, for example, among the four (4) optical beams launched into optical lens assembly 30 from WDM filter module 20. For example, a physical spacing of the four optical beams may be reduced from a first pitch D of spacing, at the input of contracting lens module 31, to a second pitch d of spacing with D/d≥2, at the output of contracting lens module 31.

Optical lens assembly 30 may also include a second lens assembly 32, referred to hereinafter as a steering lens module, positioned right after contracting lens module 31, that may be adapted and/or able to provide focus and steer propagation direction of the pitch-reduced optical beams coming out of contracting lens module 31. For example, steering lens module 32 may be adapted and/or able to change propagation direction of the set of optical beams from contracting lens module 31, upward, downward, or in any desirable direction, and focus them onto, for example, a set of photo-diodes of a photodiode array (not shown) for detection and further signal processing.

Figure 3:
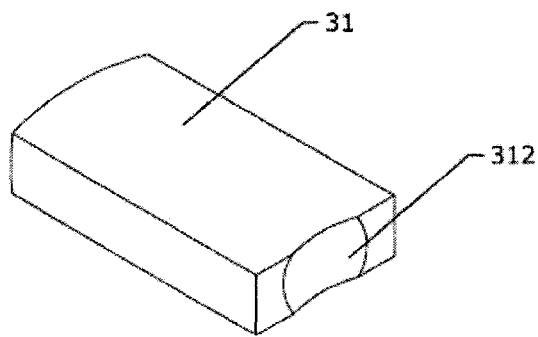
FIG. 3 is a demonstrative illustration of perspective view of a contracting lens module in an ultra-small-pitch optical filter assembly according to one embodiment of present invention.
Figure 4:
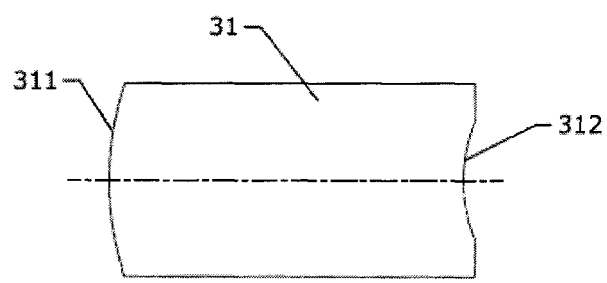
FIG. 4 is a demonstrative illustration of top plan view of the contracting lens module as illustrated in FIG. 3.

FIG. 3 and FIG. 4 are demonstrative illustrations of respective perspective view and top plan view of a contracting lens module in an ultra-small-pitch optical filter assembly according to one embodiment of present invention. More specifically, contracting lens module 31 may include a front convex surface 311 and a rear concave surface 312 that are adapted and/or able to reduce physical spacing of optical beams that are launched into contracting lens module 31 via its front convex surface 311, as being described below in more details. For example, front convex surface 311 may have a focal point that coincides with a focal point of rear concave surface 312, a focal length F of front convex surface 311 and a focal length f of rear concave surface 312 may satisfy a F/f ratio equal to or larger than 2 (F/f=−2). Assuming optical beams coming out of WDM filter elements 22 (of WDM filer module 20) have a first pitch D of spacing, which correspond to a center spacing among WDM filter elements 22, optical beams coming out of contracting lens module 31 may have a second pitch d of spacing, wherein D/d=F/f.

According to further embodiment of present invention, both front convex surface 311 and rear concave surface 312 may be in a spherical-shape, although embodiments of present invention are not limited in this aspect and other non-spherical shape of convex and concave surfaces may be used as well. Both front convex and rear concave surfaces may be coated or plated with an anti-reflective coating or film to reduce back-reflection.

Figure 5:
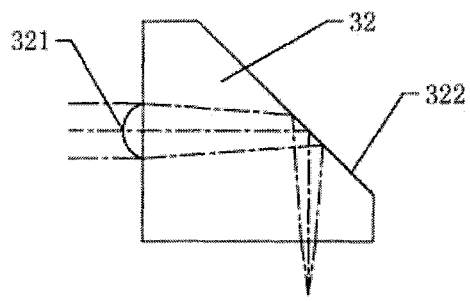
FIG. 5 is a demonstrative illustration of schematic diagram of a steering lens module in an ultra-small-pitch optical filter assembly according to one embodiment of present invention.
Figure 6:
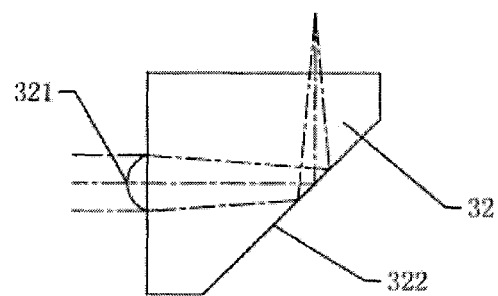
FIG. 6 is a demonstrative illustration of schematic diagram of a steering lens module in an ultra-small-pitch optical filter assembly according to another embodiment of present invention.

FIG. 5 and FIG. 6 are demonstrative illustrations of schematic diagrams of a steering lens module in an ultra-small-pitch optical filter assembly according to one embodiment of present invention. Steering lens module 32 may be positioned right after contracting lens module 31 to receive output optical beams from contracting lens module 31. A front surface of steering lens module 32 may be mounted with a micro-lens array 321. Micro-lens array 321 may include a set of micro lenses such as, for example, four (4) micro lenses 3211 as demonstratively illustrated in FIG. 1. The number of micro lenses generally correspond to the number of optical beams received from contracting lens module 31, which in-turn is determined by the number of optical beams coming out of WDM filter module 20. The set of micro lenses 3211 are generally arranged horizontally (only one is shown in FIGS. 5 and 6 since both FIGS. 5 and 6 are front elevation views), and are used to provide focus function to the optical beams coming from contracting lens module 31.

Figure 7:
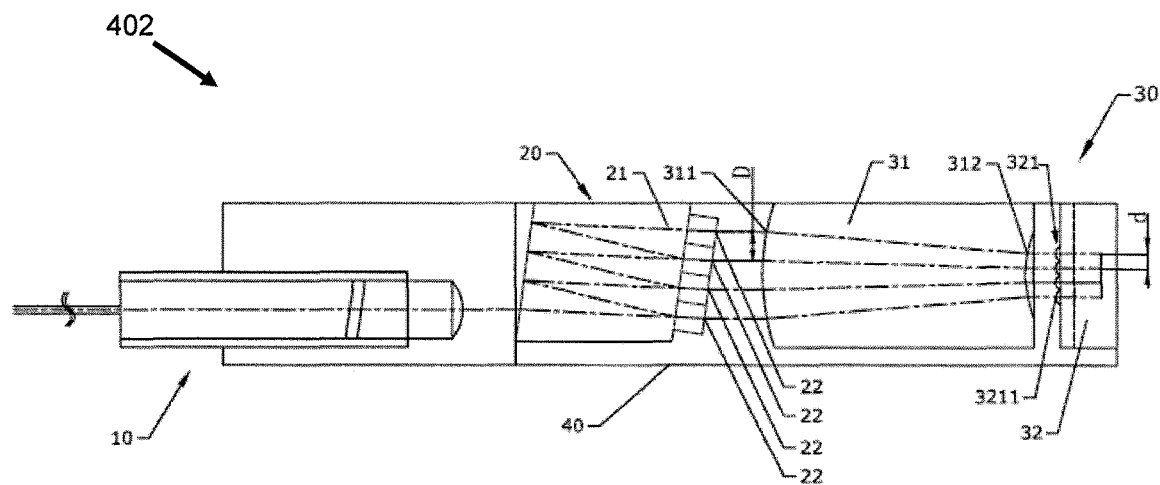
FIG. 7 is a demonstrative illustration of top plan view of an ultra-small-pitch optical filter assembly according to another embodiment of present invention.
Figure 8:
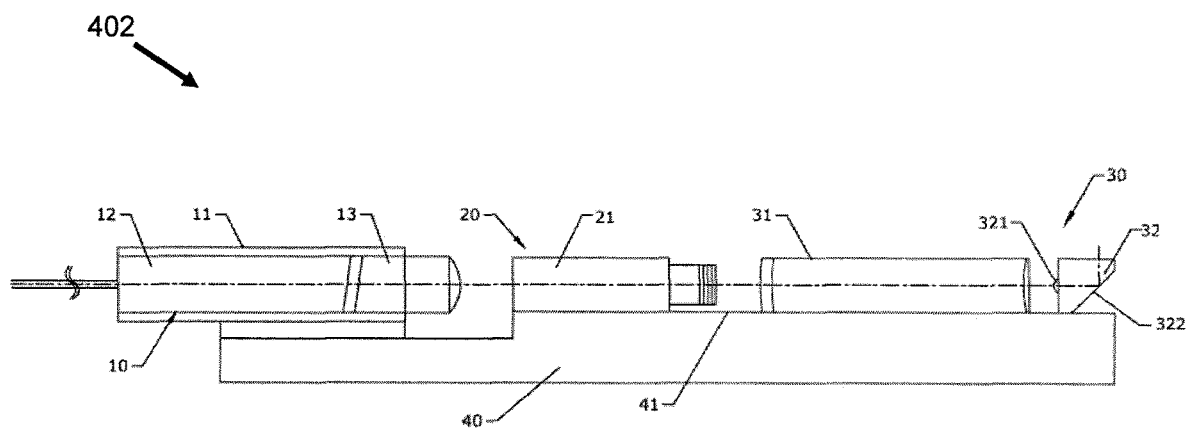
FIG. 8 is a demonstrative illustration of front elevation view of the ultra-small-pitch optical filter assembly as illustrated in FIG. 7.

Steering lens module 32 may be further provided with an inclined rear surface 322, in an angle to input optical beams, for steering or changing direction of the optical beams passing through micro lenses 3211. In FIGS. 1, 2 and 5, the inclined rear surface 322 of steering lens module 32 is demonstratively illustrated of having a downwardly inclined rear surface 322. Optical beams passing through micro-lenses 3211 may be deflected downwardly toward, for example, a photodiode array (not shown) or other types of receiving devices. However, embodiment of present invention is not limited in this aspect. As is illustrated in FIG. 6, and ultra-small-pitch optical filter assembly 402 illustrated in FIGS. 7 and 8, steering lens module 32 may have an inclined rear surface 322 facing upward, or any other desired direction. When optical beams pass through micro-lenses 3211, they may be deflected by inclined rear surface 322 upwardly, or in any other desired direction, toward one or more receiving devices, such as a photodiode array, that are positioned accordingly in that direction.

According to one embodiment of present invention, fiber collimator 10, glass body 21 of WDM filter module 20, contracting lens module 31 and steering lens module 32 of optical lens assembly 30 may be mounted on a common substrate 40 (see FIGS. 1-2 and 7-8). Substrate 40 may be a glass substrate although embodiment of present invention is not limited in this aspect and substrate of other materials may be used as well. Substrate 40 may have one or more height-adjusting steps such as step 41. In one embodiment, fiber collimator 10 may be mounted on a lower surface of substrate 40 and glass body 21, contracting lens module 31, and steering lens module 32 may all be mounted on an upper surface, such as a surface of elevated step 41, of substrate 40. The one or more height differences among the one or more height-adjusting steps may be adapted and/or provided such that mounting positions of fiber collimator 10, WDM filter module 20, contracting lens module 31, and steering lens module 32 may be vertically adjusted to be optically aligned with each other, and with respect to a common horizontal optical axis. For example, optical axes of fiber collimator 10, WDM filter module 20, contracting lens module 31, and steering lens module 32 may be adjusted to a common height level.

According to one detailed embodiment, optical lens assembly 30 of an ultra-small-pitch (USP) optical filter assembly may have a contracting lens module 31 that has a front convex surface 311 and a rear concave surface 312, both of which are spherical surfaces. Focal length F of front convex surface 311 and focal length f of rear concave surface 312 has a ratio F/f that equals two (2). Curvature radius R of front convex surface 311 and curvature radius r of rear concave surface 312 satisfy a relationship of R/r=F/f=2. More specifically, curvature radius R of front convex surface 311 equals R=4 mm, curvature radius r of rear concave surface 312 equals r=2 mm. A center thickness of contracting lens module 31 equals 4.553 mm, with a refractive index (@1309 nm) of 1.783. Parameters of this contracting lens module 31 may be summarized as in below table 1.

TABLE 1

One Embodiment of a Contracting Lens Module

| Surface | Radius (mm) | Thickness (mm) | Reflective Index (@1309 nm) | Secondary aspheric coefficient (Conic) |
|---|---|---|---|---|
| Front convex surface 311 | 4 | 4.553 | 1.783 | 0 |
| Rear concave surface 312 | 2 | / | 1 | 0 |

Convex and concave surfaces 311 and 312 of contracting lens module 31 may be coated or plated with an anti-reflection coating or film, resulting in a reflectance R≤0.3% @ 1260 nm-1620 nm. Assuming a spacing D of 0.5 mm between optical beams passing through WDM filter elements 22 of WDM filter module 20, and a spacing d between optical beams passing through micro lenses 3211, based upon D/d=F/f=2, spacing d equals 0.25 mm.

Curved surface of micro-lens 3211 is a quadratic aspherical surface, and has a radius of curvature at the apex of curved surface of 0.705 mm, a refractive index (@1309 nm) of 1.783, and a secondary aspheric coefficient (Conic) of −0.474.

According to another detailed embodiment, optical lens assembly 30 of a USP optical filter assembly may have a contracting lens module 31 that has a front convex surface 311 of an aspherical surface and a rear concave surface 312 of a spherical surface. Focal length F of front convex surface 311 and focal length f of rear concave surface 312 has a ratio F/f=2, and curvature radius R of front convex surface 311 and curvature radius r of rear concave surface 312 satisfy R/r=F/f=2. More specifically, curvature radius R of front convex surface 311 maybe R=3 mm, with a secondary aspheric coefficient (Conic) of −0.159, and curvature radius r of rear concave surface 312 may be r=1.5 mm. A center thickness of contracting lens module 31 may be 3.415 mm, with a refractive index (@ 1309 nm) of 1.783. Parameters of the contracting lens module 31 may be summarized as in below table 2.

TABLE 2

Another Embodiment of a Contracting Lens Module

| Surface | Radius (mm) | Thickness (mm) | Reflective Index (@1309 nm) | Secondary aspheric coefficient (Conic) |
|---|---|---|---|---|
| Front convex surface 311 | 3 | 3.415 | 1.783 | −0.159 |
| Rear concave surface 312 | 1.5 | / | 1 | 0 |

Convex and concave surfaces 311 and 312 of contracting lens module 31 may be plated or coated with an anti-reflection film or coating, with a reflectance is R≤0.3% @ 1260 nm-1620 nm. Assuming a spacing D of 0.5 mm between optical beams passing through WDM filter elements 22, and a spacing d between optical beams passing through micro-lenses 3211, based upon D/d=F/f=2, spacing d equals 0.25 mm.

Similarly, curved surface of micro-lens 3211 is a quadratic aspherical surface, with a radius of curvature at the apex of curved surface of 0.705 mm, a refractive index (n1309 nm) of 1.783, and a secondary aspheric coefficient (Conic) of −0.474.

Figure 9:
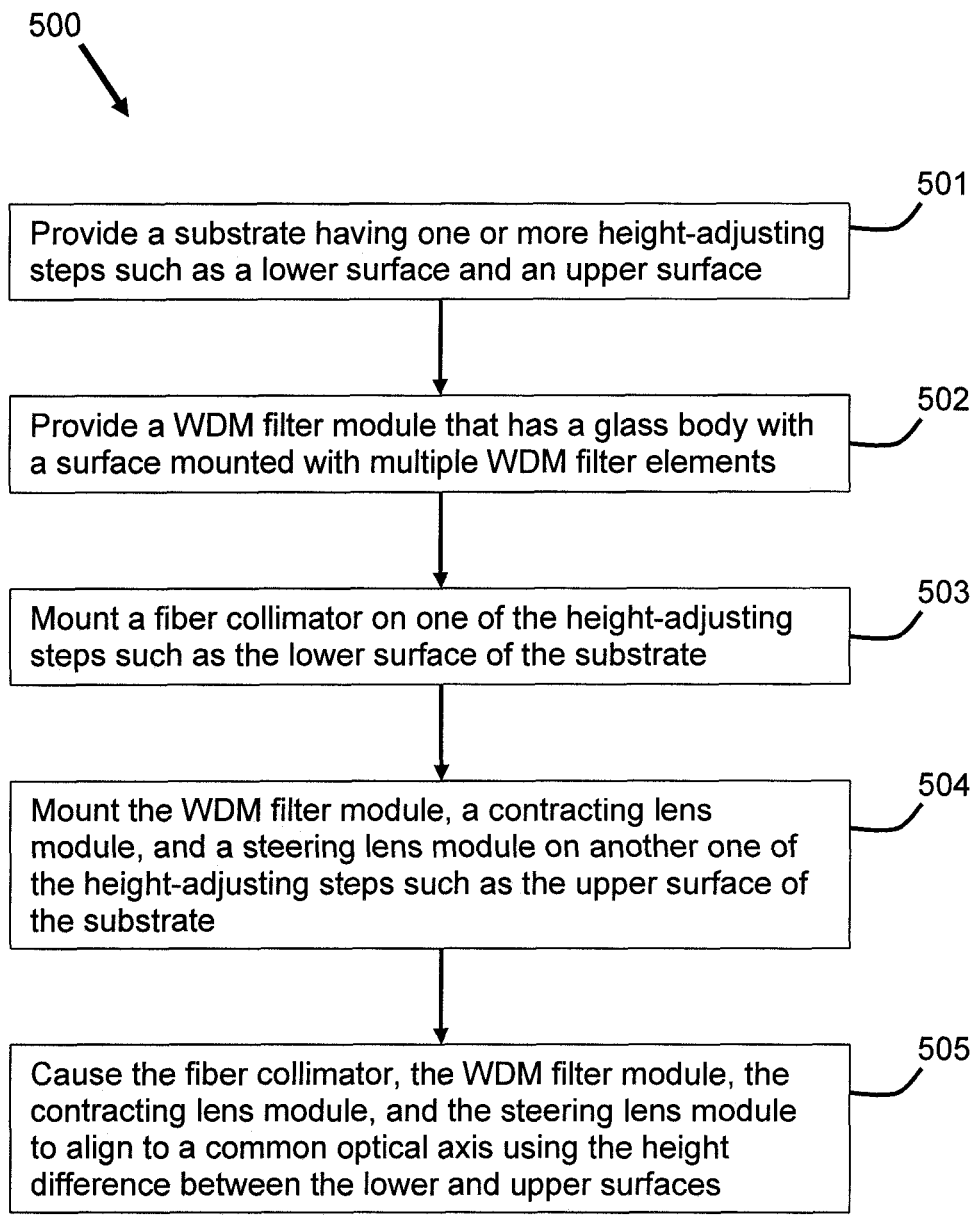
FIG. 9 is a demonstrative illustration of a flowchart of a method of fabricating an ultra-small-pitch optical filter assembly according to an embodiment of present invention.

FIG. 9 is a demonstrative illustration of a flowchart of a method of fabricating an ultra-small-pitch optical filter assembly according to an embodiment of present invention. For example, in one embodiment, the method 500 may include providing a substrate, which may be a mounting platform, that has one or more height-adjusting steps as in step 501; and providing a WDM filter module as in step 502. The substrate maybe a glass substrate, as a non-limiting example, and the one or more height-adjusting steps may include a lower surface and an upper surface. The WDM filter module may have a glass body with a surface mounted with multiple WDM filter elements.

Embodiment of the method may further include mounting a fiber collimator on one of the height-adjusting steps such as the lower surface of the substrate as in step 503; and mounting the WDM filter module, a contracting lens module, and a steering lens module on another step of the height-adjusting steps such as the upper surface of the substrate as in step 504. A difference in height between the lower surface and upper surface of the substrate, and in general among the one or more height-adjusting steps, enables or cause optical alignment among the fiber collimator, the WDM filter module, the contracting lens module, and the steering lens module along a common height level or a horizontal optical axis as in step 505.

In one embodiment, providing the WDM filter module as in step 502 may further include providing a glass body that has a front surface and a rear surface, and mounting multiple WDM filter elements, such as four (4), six (6), eight (8) or even more, on the rear surface that correspond to different wavelengths of an input WDM optical signal.

In another embodiment, the method may include mounting a fiber collimator on a substrate adapted and/or able to accept or receive an optical input signal which may be a WDM signal having multiple wavelengths; mounting a WDM filter module on the same substrate behind the fiber collimator to receive optical output from the fiber collimator, the WDM filter module may de-multiplex the optical input signal into, for example, four optical beams of wavelength bands with different center wavelengths; mounting a contracting lens module to receive the four optical beams from the WDM filter module and reduce a physical spacing among the optical beams from a first pitch D of spacing to a second, and smaller, pitch d of spacing; and mounting a steering lens module to receive the optical beams of reduced spacing pitch from the contracting lens module first lens assembly, and to direct and focus the optical beams onto, for example, a photodiode array.

More specifically, under normal application and according to one embodiment, a WDM optical signal with multiple, such as four (4) and hereinafter, different wavelengths may be launched into a USP optical filter assembly 401 or 402 (as in FIGS. 1-2 and 8-9) via a fiber collimator 10. The input optical signal or light beam may be collimated by fiber collimator 10 to form collimated light propagating onto a WDM filter module 20. Upon incident, WDM filter elements 22 of WDM filter module 20 may de-multiplex the WDM optical signal, based upon their different wavelengths, to form four different optical beams having a first pitch of beam spacing D. The four optical beams may subsequently pass through a contracting lens module 31 with spacing among the four optical beams being reduced to a second pitch d. The pitch-reduced optical beams may then passes through a micro-lens array 321 of a steering lens module 32. Each individual micro lens 3211 of micro-lens array 321 may focus their respective optical beams. Steering lens module 32 may further deflect the optical beam, through an inclined rear surface 322 coated with a highly reflective coating, toward a photodiode array for detection and further signal processing. For example, when the photodiode array is positioned below USP optical filter assembly 401, steering lens module 32 may have an downwardly inclined surface 322 to cause optical beams coming from micro-lenses 3211 to travel downward to enter the photodiode array. Otherwise, when the photodiode array is positioned above USP optical filter assembly 402, steering lens module 32 may have an upwardly inclined surface 322 to cause optical beams to travel upward accordingly. More generally, the inclined rear surface 322 may have any other orientation to accommodate other design and placement of the photodiode array.

Figure 10:
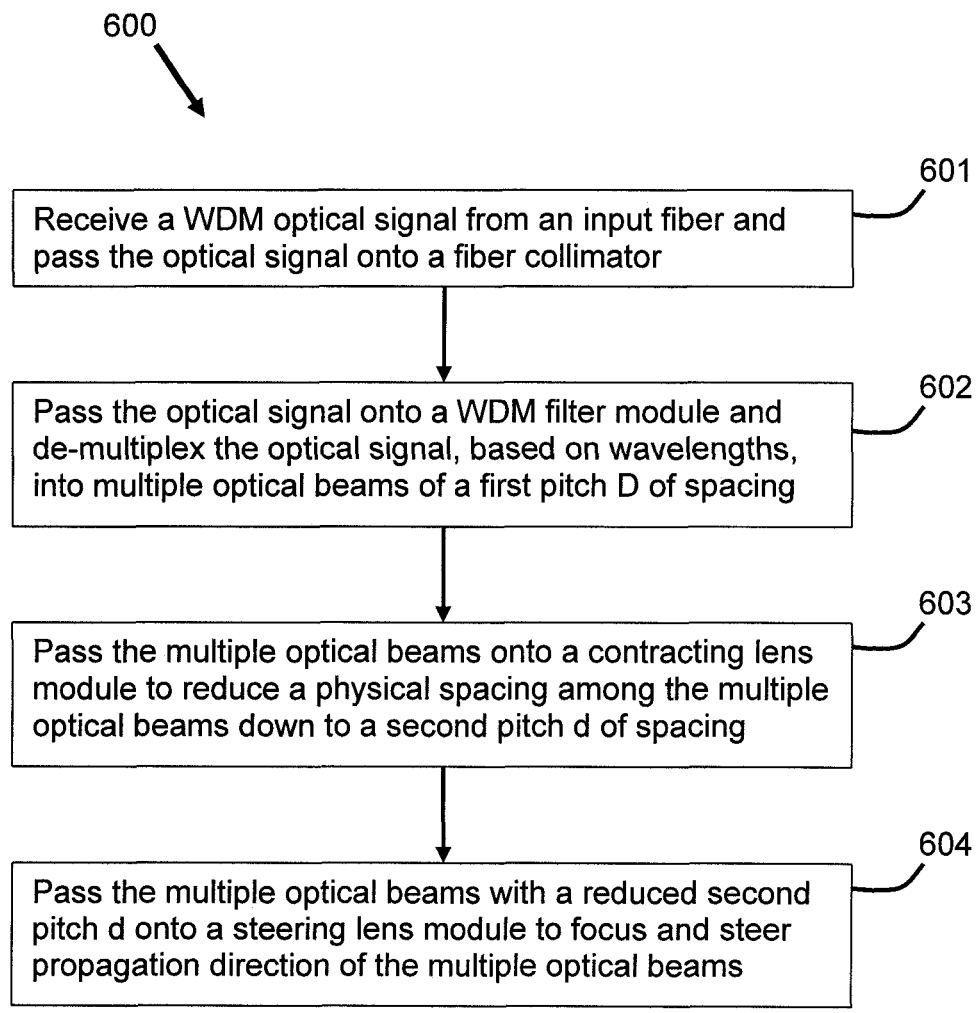
FIG. 10 is a demonstrative illustration of a flowchart of a method of producing a set of optical beams of ultra-small-pitch of spacing according to an embodiment of present invention.

FIG. 10 is a demonstrative illustration of a flowchart of a method of producing a set of optical beams of ultra-small-pitch of spacing according to an embodiment of present invention. In one embodiment, the method 600 may include receiving a WDM optical signal from an input fiber and subsequently passing the optical signal onto a fiber collimator as in step 601. The method further include passing the optical signal from the fiber collimator onto a WDM filter module that is positioned right behind the fiber collimator as in step 602. The WDM filter module may de-multiplex the optical signal, based on wavelengths, into multiple optical beams of a first pitch D of spacing. Furthermore, the method may include passing the multiple optical beams from the WDM filter module onto a contracting lens module that may reduce a physical spacing among the multiple optical beams down to a second pitch d of spacing with D/d as in step 603. With reduced pitch of spacing among the optical beams, the method may include passing the multiple optical beams onto a steering lens module as in step 604. The steering lens module may be used to focus and steer propagation direction of the multiple optical beams, and ultimately toward, for example, a photodiode array for detection and signal processing.

While certain features of the invention have been illustrated and described herein, many modifications, substitutions, changes, and equivalents will now occur to those of ordinary skill in the art. Such changes, modifications, and/or alternative embodiments may be made without departing from the spirit of present invention, and are hereby all considered within the scope of present invention. It is, therefore, to be understood that the appended claims are intended to cover all such modifications and changes as fall within the spirit of the invention.

What is claimed is:

1. An ultra-small-pitch optical filter assembly comprising:
a fiber collimator being able to receive an optical signal;
a WDM (wavelength-division-multiplexing) filter module being able to de-multiplex said optical signal coming from said fiber collimator into a plurality of optical beams based upon their wavelengths; and
an optical lens assembly being able to receive said plurality of optical beams from said WDM filter module and reduce a physical spacing among said plurality of optical beams from a first pitch D of spacing to a second pitch d of spacing, wherein D/d≥2.

2. The ultra-small-pitch optical filter assembly of claim 1, wherein said WDM filter module comprises a glass body, a front end of said glass body facing said fiber collimator, and a rear end of said glass body facing said optical lens assembly,
wherein a surface of said rear end is mounted with at least four WDM filter elements that correspond, respectively, to at least four of said plurality of optical beams.

3. The ultra-small-pitch optical filter assembly of claim 1, wherein said optical lens assembly comprises:
a contracting lens module being able to reduce said physical spacing among said plurality of optical beams from said first pitch D of spacing to said second pitch d of spacing; and
a steering lens module being able to provide focus and steer propagation direction of said plurality of optical beams having said second pitch d of spacing.

4. The ultra-small-pitch optical filter assembly of claim 3, wherein said contracting lens module has a front end of convex surface facing said WDM filter module; and a rear end of concave surface facing said steering lens module, a focal point of said convex surface coincides with a focal point of said concave surface; and a focal length F of said convex surface and a focal length f of said concave surface satisfies F/f≥2 with D/d=F/f.

5. The ultra-small-pitch optical filter assembly of claim 3, wherein said steering lens module comprises a micro-lens array mounted at a front end surface thereof, said micro-lens array includes at least four micro-lenses that provide focus of at least four respective optical beams coming from said contracting lens module having said second pitch d of spacing.

6. The ultra-small-pitch optical filter assembly of claim 5, wherein said steering lens module further comprises a rear surface that is inclined in an angle to optical beams passing through said micro-lenses, said inclined rear surface steering said optical beams from a first direction towards a second direction that is different from said first direction.

7. The ultra-small-pitch optical filter assembly of claim 3, wherein said fiber collimator, said WDM filter module, said contracting lens module, and said steering lens module are optically aligned in a horizontal direction.

8. The ultra-small-pitch optical filter assembly of claim 1, wherein said fiber collimator, said WDM filter module, and said optical lens assembly are mounted on a common substrate, said common substrate having one or more height-adjusting steps that are provided to cause said fiber collimator, said WDM filter module, and said optical lens assembly to be vertically adjusted with respect to a common optical axis.

9. A method of fabricating ultra-small-pitch optical filter assembly comprising:
providing a substrate having a lower surface and an upper surface;
providing a WDM filter module;
mounting a fiber collimator on said lower surface of said substrate; and
mounting said WDM filter module, a contracting lens module, and a steering lens module on said upper surface of said substrate,
wherein said lower and upper surfaces of said substrate cause said fiber collimator, said WDM filter module, said contracting lens module, and said steering lens module to be aligned along a horizontal optical axis, and wherein said contracting lens module is able to reduce a physical spacing among a plurality of optical beams coming from said WDM filter module from a first pitch D of spacing to a second pitch d of spacing with D/d≥2.

10. The method of claim 9, wherein providing said WDM filter module comprises:
providing a glass body having a front end and a rear end; and
mounting at least four WDM filter elements on a surface of said rear end,
wherein said WDM filter module is able to receive, from said fiber collimator, an optical signal at said front end, to de-multiplex said optical signal into at least four optical beams through said at least four WDM filter elements at said rear end, and to pass said at least four optical beams onto said contracting lens module.

11. The method of claim 9, wherein a front and a rear surface of said contracting lens module have respectively a front convex surface and a rear concave surface, both said front convex surface and rear concave surface are plated with an anti-reflection coating, a focal length F of said front convex surface and a focal length f of said rear concave surface satisfies F/f≥2, and a focal point of said front convex surface coincides with a focal point of said rear concave surface.

12. The method of claim 9, wherein said steering lens module comprises a micro-lens array at a front end surface thereof, said micro-lens array comprises at least four micro-lenses being able to provide focus and steer propagation direction of optical beams from said contracting lens module.

13. A method of producing a set of optical beams of ultra-small-pitch comprising:
receiving an optical signal from an input fiber;
passing said optical signal onto a WDM filter module through a fiber collimator, said WDM filter module de-multiplexing said optical signal into a plurality of optical beams of a first pitch D of spacing, based on their respective optical wavelengths;
passing said plurality of optical beams of said first pitch D of spacing onto a contracting lens module, said contracting lens module reducing a physical spacing of said plurality of optical beams down to a second pitch d of spacing with D/d≥2,
wherein said contracting lens module has a front end of convex surface and a rear end of concave surface, a focal point of said convex surface coincides with a focal point of said concave surface, and a focal length F of said convex surface and a focal length f of said concave surface satisfies F/f≥2 with D/d=F/f.

14. The method of claim 13, wherein passing said optical signal onto said WDM filter module comprises causing said optical signal to go through a de-multiplexing process provided by at least four WDM filter elements, said at least four WDM filter elements being mounted on a rear end surface of a glass body of said WDM filter module.

15. The method of claim 13, further comprising focusing and steering propagation direction of said plurality of optical beams of said second pitch d of spacing through a steering lens module.

16. The method of claim 15, wherein said steering lens module comprises a micro-lens array mounted at a front end surface thereof, said micro-lens array includes at least four micro-lenses that provide focus of at least four optical beams coming from said contracting lens module.

17. The method of claim 16, wherein said steering lens module further comprises a rear surface that is inclined in an angle to optical beams passing through said micro-lenses, said inclined rear surface steering said optical beams from a first direction towards a second direction that is different from said first direction.

18. The method of claim 13, further comprising providing optical alignment among said fiber collimator, said WDM filter module, said contracting lens module, and said steering lens module to a common optical axis for said optical signal.

19. The method of claim 18, wherein providing said optical alignment comprises mounting said fiber collimator, said WDM filter module, said contracting lens module, and said steering lens module on a substrate having one or more height-adjusting steps that are able to provide said fiber collimator, said WDM filter module, said contracting lens module, and said steering lens module with said optical alignment.

* * * * *